Oct. 26, 1943.   D. G. FAWKES   2,332,630
SNAP ACTION RELIEF VALVE
Filed Aug. 7, 1941   3 Sheets-Sheet 1

Inventor:
Donald G. Fawkes:
By: Joseph O. Lange Atty.

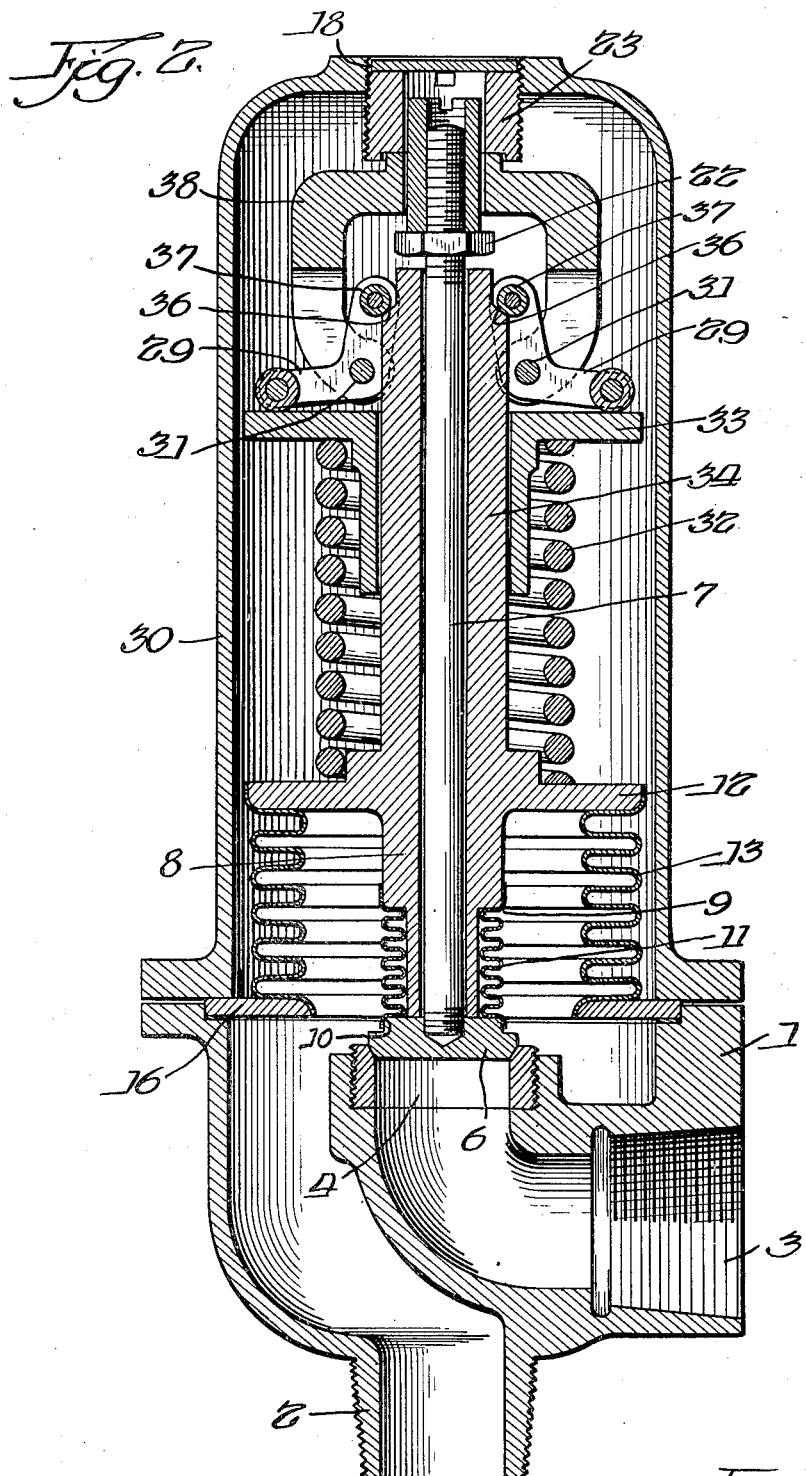

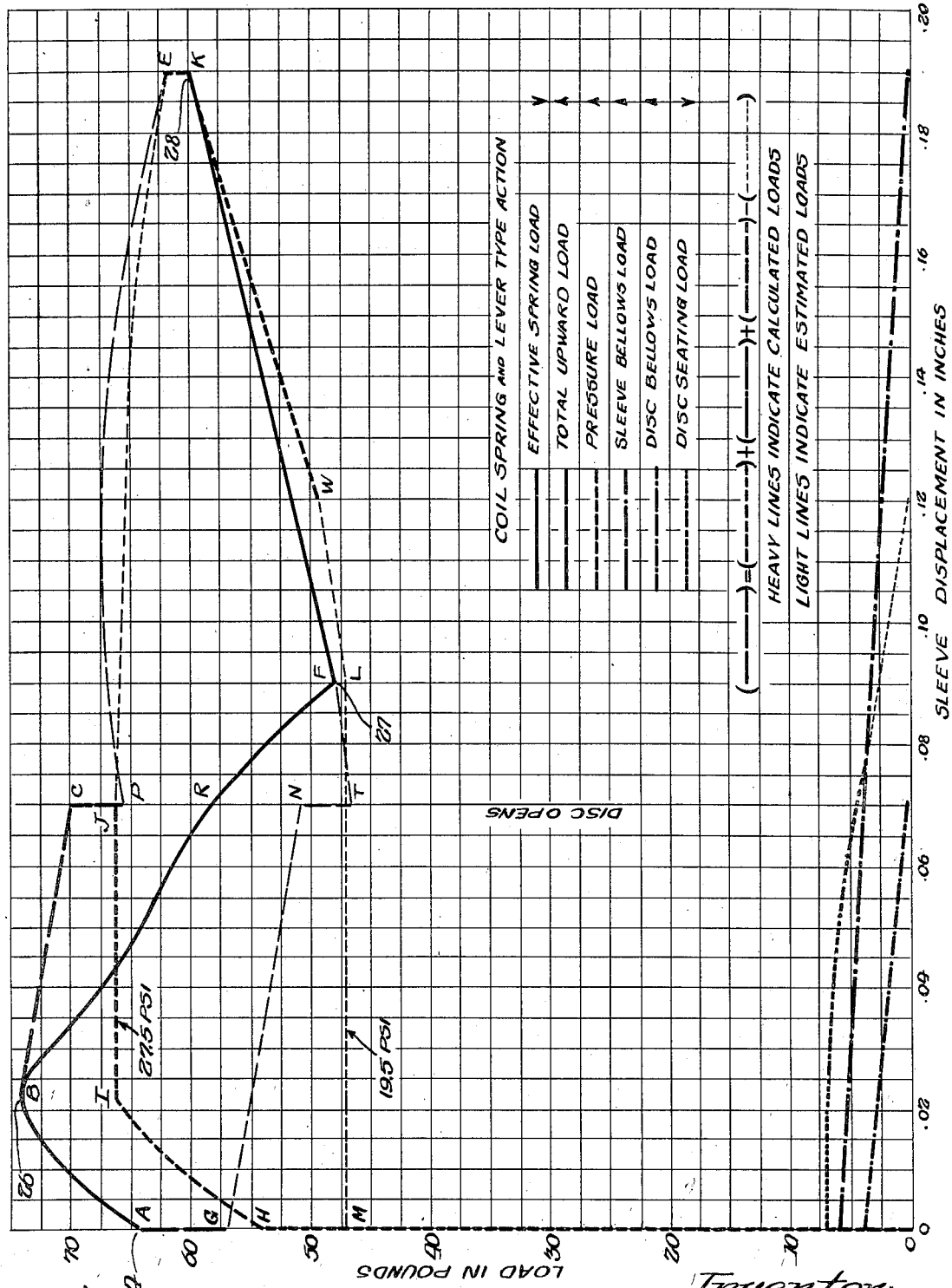

Patented Oct. 26, 1943

2,332,630

UNITED STATES PATENT OFFICE 2,332,630

SNAP ACTION RELIEF VALVE

Donald G. Fawkes, Chicago, Ill., assignor to Crane Co., Chicago, Ill., a corporation of Illinois Application August 7, 1941, Serial No. 405,779

5 Claims. (Cl. 137—53)

This invention relates to a novel and improved snap action relief valve and has for one of its principal objects the provision of an effective hammer-blow action that tends to remove lime deposits and the like, thus eliminating the necessity for frequent repairs.

One of the more common causes of boiler failure and breakage is traceable to the sudden and excessive rise in boiler pressures due to faulty relief valve operation. In many cases, it has been found that bonding of the relief valve disc or closure member to its seat by deposited lime (CaCO₃) is one of the chief sources of this trouble. Numerous types of relief valves have been designed in an effort to overcome this difficulty. At the outset, it must be realized that it is desirable that a relief valve for hot water boilers shall remain tight at the seat substantially up to the instant at which it opens appreciably, and further that it shall remain open until the pressure has been relieved to an amount substantially lower than the maximum allowable working pressure. Previous conventional designs performed neither of these functions satisfactorily, and accordingly, an important object of the present invention is to provide a valve capable of fulfilling all these desirable conditions.

Another important object of this invention is to provide a relief valve wherein in combination with the novel construction hereinafter described in detail the line fluid being discharged does not contact any of the operating mechanisms.

A still further object of this invention lies in the provision of a positive operating relief valve capable of discharging fluid at the maximum possible generating rate of the boiler in the event, for example, that the water level should fall below the top of the boiler.

Another important object of this invention is to provide means associated with a helical spring whereby the effective spring load is caused to have a negative effect during a portion of the spring deflection range.

Other and further important objects will become apparent from the disclosures in the specification and accompanying drawings, in which Fig. 1 is a vertical sectional view of the snap action relief valve of this invention.

Fig. 2 shows a modified form of this invention.

Fig. 3 is a graph showing the desirable effective spring load of the spring used in this invention.

Figure 1:
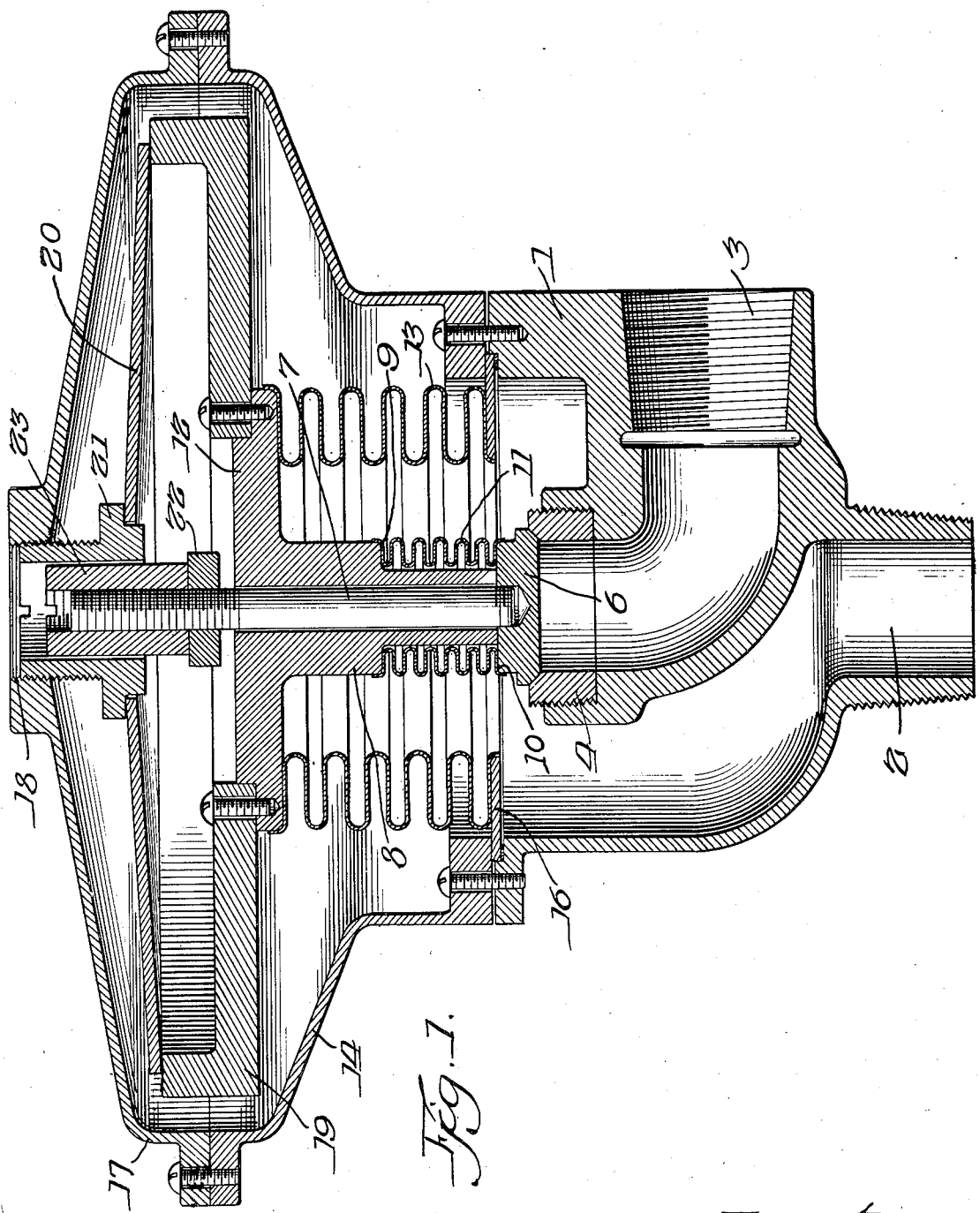

As shown in the drawings wherein like reference numerals refer to like parts throughout the drawings, the reference numeral 1 indicates generally the casing or body of the valve, having an inlet 2 and an outlet 3. A seat 4 is positioned in the outlet of this valve having a closure member 6 for cooperation therewith. A stem 7, unitary with the closure member 6 made either integrally a part of, or made separately but fastened rigidly together by threads or some other means, extends upwardly from the said closure member. Surrounding the stem 7 is a slidably movable sleeve 8 having a lower depending shoulder 9 to facilitate fastening of the upper end of the bellows 11, the sleeve being longitudinally movable with relation to the stem 7. The lower end of the bellows 11 is fixedly attached to the closure member 6, as indicated at 10. The sleeve 8 is provided with an enlarged flange 12 to which is annularly attached the larger bellows 13 by brazing, welding, or any other suitable connection. The lower end of the bellows 13 is preferably clamped at the joint between the bonnet 14 and the housing 1 by means of the annular member 16 and to which the bellows is attached in any similar manner, as above described. From this construction, it is quite apparent that the inlet fluid pressure acts between the two bellows and that the effective pressure area is measured by the difference between the cross-sectional area of the large bellows 13 and the cross-sectional area of the small bellows 11, the latter members (bellows 11 and 13) serving as the actuator means for the snap action relief valve without however serving as a control or restraining means for the valve. In addition to acting as the pressure actuators of the valve, the bellows 11 and 13 prevent line fluid from making direct contact with the control means of the valve. The bonnet 14 is supplied with a cap 17 having a screw-threaded opening 18 in the top thereof. A ring extension 19 is added to the outwardly extending flange 12 of the sleeve 8. A Belleville type spring 20 is positioned thereon. Threaded inwardly into the opening 18 of the cap 17 is the nut 21 having a shouldered portion in which the inner side of the Belleville spring 20 rests.

The upper end of the stem 7 is externally threaded for engagement with the nut 22. This nut 22 is locked at a predetermined distance from the top of the sleeve 8 by means of the locknut 23 superimposing the nut 22.

The Belleville spring, as indicated, is an annular disc spring which is dish-shaped, having the particular characteristics better described by the diagram constituting Fig. 3 of the drawings which shows the effective spring load wherein the actuation load shown at 24 is comparatively high because of pre-compression of the springs when assembly is made, and the load increases suddenly for a short period to the point 26 whereupon the effective load is decreased rapidly to the point 27 and then increases again at an even rate to the point 28. The annular dish-shaped spring which possesses these peculiar characteristics is limited to those having a ratio between the ranges of $\sqrt{2}$ to $\sqrt{8}$ for the free height of the spring to the thickness of the material, that is to say the spring dimensions when free from distortion, the ratio of the free height to thickness of material, must be selected to obtain the type of load curve described. The sliding stem sleeve 8 is attached directly to the spring and hence moves simultaneously with the spring 20. The sleeve lifts or rises separately from the closure member 6. When the top of the sleeve 8 contacts the bottom of the nut 22 which is threaded to the stem 7, the closure member begins its opening. The space between the top of the stem sleeve and the nut 22 is adjusted so that the sleeve and nut will contact between the points 26 and 27 shown in the graph in Fig. 3. From all viewpoints, except that of valve assembly, it would be desirable to have the sleeve contact the stem nut at point 27. However, if the sleeve contacts the nut at some displacement to the right of point 27, it is possible that during the closing cycle the disc might close before the sleeve displacement had decreased to that at point designated 27; in such a case, the pressure would cease to fall and the sleeve could not return to the zero displacement position. To make certain that this never occurs it will be necessary in assembling the valve to adjust the stem nut so that the sleeve strikes the nut before point 27 is reached. From the theoretical angle, however, the valve could be made to operate by adjusting the nut for contact at any point between 26 and 27. During the cycle of spring operation as shown between these points 26 and 27, the effective spring load is diminishing rapidly whereupon the stem sleeve is rising rapidly. While rising rapidly the stem sleeve 8 contacts the nut 22 and snaps open the closure member 6.

Under numerous normal installations, the proposed valve will undoubtedly be subjected to conditions which are conducive to liming, thus causing the closure member to stick to the seat and require an undue amount of pressure to lift it therefrom. The load required to lift the disc from its seat may constitute a considerable portion of the total fluid pressure load. The operation just described for my proposed valve supplies this needed pressure by a separate movement of the stem sleeve which gains the necessary momentum to pull the closure member from its seat. The snap action or hammer-blow obtained in this operation tends to crack, break up and to dislodge all calcium carbonates, salts, foreign matter or other deposits which may have formed an adhesion around the seat. A shock or impact load is quite effective in breaking any structure and particularly so in the case of a brittle material such as lime. The hammer-blow action not only aids in lifting the closure member from its seat, but also when the closure member is returned to its seat it helps in assuring a positive sealing between the closure member 6 and the seat 4. As will be seen from the graph in Fig. 3, the closing action of the valve follows the effective spring load from right to left instead of forward (left to right) as described for the opening of the closure member. At a point between the locations designated 27 and 26, as shown in the graph in Fig. 3, the inlet line pressure will have been reduced, by escape to the outlet 3, to such an extent that it has become lower than the spring load. At this point the action reverses, and where the closure member previously opened, the sleeve now begins to separate or pull away from the nut 22 and as the downward load of the spring increases, the lower end of the sleeve 8 contacts sharply against the closure member 6, thus forcing it to the seat 4 with an impact or hammer-blow action.

In order to operate successfully, the spring used in this valve must have the particular characteristics as possessed by the type exemplified by the graph in Fig. 3. It is one of the further objects of this invention to employ helical springs in this valve with additional means for acquiring the characteristics of the Belleville type of spring. Ordinarily, a helical spring has a straight line increase in effective loads. It is the purpose of this invention to change the straight line graph of the helical spring to a curve similar to that of the graph in Fig. 3. It has been found that this transformation can be accomplished in several different ways, but the one I propose to use, as best shown in Fig. 2 of the drawings, employs a pair of bell crank levers 29 pivoted at 31 so that the helical spring 32 with its loosely mounted sleeve 33 acts upon the lower arm of these levers 29. The springs when assembled in the valve are precompressed the amount required to obtain the load indicated at point 24 on the graph shown in Fig. 3.

The modified form of valve shown in Fig. 2 has the same bellows actuating elements as the valve shown in Fig. 1. The bonnet and cap are here made as a unitary element 30. The sleeve 8 is provided with an upper extension 34 having inclined surfaces 36 upon which the rollers 37 of the bell crank levers ride. The bell crank levers 29 pivoted at 31 are supported by the member 38 with the upper cylindrical portion being slidably journaled above the nut 22, as indicated, and the lower slotted section serving as the anchoring means for the pivot 31.

In consideration of the particular service intended and by proper selection of suitable lever ratios, roller diameters, shoulder angle 36, spring load-deflection rate, initial spring load, and like related essentials, it is possible to obtain the load displacement curve shown in the graph in Fig. 3 in which the abscissa represents the displacement of the sleeve with respect to its lowermost limit of travel, while the ordinate represents the total effective spring load acting downwardly upon the sleeve 8. The effective spring load includes both the load exerted by the lower end of the spring 32 upon the sleeve flange 12 and that applied to the angular shoulder 36 on the sleeve through the bell crank levers 29, which are loaded by the upper end of the spring 32 through action of the additional sleeve 33 on the lower arms of the bell crank levers 29. It will be further apparent that as the sleeve 8 is moved upward by increase of fluid pressure within the inlet of the valve, this pressure acting on a surface equal to the difference between the areas of the two bellows 11 and 13, and in a direction of the line of the force exerted by the rollers 37 on the angular shoulders 36 will swing toward a horizontal position. Thus the component along the axis of the sleeve will decrease. This component becomes zero when the edge of the shoulder reaches the horizontal line through the centers of rollers 37. Obviously, the mechanism may be so proportioned that the decrease in force applied to the sleeve by the rollers 37 is considerably greater than the increase in the force applied to the sleeve flange 12 due to the increased spring compression, with the combined result that the total load tending to prevent upward movement of the sleeve will decrease as the sleeve moves upwardly, thereby imparting to it the same characteristics as the Belleville type of spring previously referred to. When the edge of the angular shoulder 36 reaches the horizontal line through the roller centers 37 the component downwardly along the sleeve axis is eliminated, disregarding frictional forces, the levers 29 attain a stationary position, and the total effective spring load which is now wholly comprised of the spring load on the sleeve flange 12 increases with the continued upward movement of the sleeve.

In the early part of the operation cycle in valve opening, when the sleeve 8 begins to move upwardly, it does not exert any downward load on the disc 6, and in order to prevent leakage at the seat during that portion of the cycle when the sleeve is moving upwardly and before it strikes the stem nut 22, a downward load must be applied to the disc 6 in order to keep it tightly closed. This is accomplished by making the seat area somewhat greater than the cross-sectional area of the disc bellows 11 so that the pressure in the body or housing 1 acting on the annular differential area therebetween, keeps the closure member 6 closed against its seat 4. This force is augmented by the normal compression load of the disc bellows, and these combined forces are found generally to be sufficient to maintain the closure member in a closed position until the upwardly moving sleeve strikes the stem nut 22. However, if this should prove to be an insufficient load on the disc, it is obvious that a spring may be inserted between the sleeve shoulder 9 and the top of the disc at 10 for exerting any further load required.

It is the purpose to provide in this type of relief valve a closure member that will automatically open at a fixed pressure and then automatically close again at some predetermined lower pressure. Two modifications of my invention have been shown and described that will positively act to relieve high pressures automatically in a pipe line, boiler or the like and then to close when the pressure in the line or boiler or other apparatus has dropped to some predetermined lower pressure.

It is apparent that the detailed construction hereinabove described may be varied throughout a wide range from the exact showings made in this specification and it is desired therefore to be limited only to the extent of the appended claims interpreted in light of the prior art.

I claim:

1. A snap action relief valve comprising a casing having an inlet and an outlet, a seat therebetween, a closure member having a stem thereon, a slidably mounted sleeve cooperating with the said stem and having an enlarged flange at an intermediate portion thereof, a bellows attached to the enlarged flange of the stem sleeve and to the casing of the said valve, another bellows within the first named bellows attached to the said sleeve and to the said closure member, spring means above the enlarged flange, bell crank levers so pivoted above the said spring means that one pair of arms of the bell crank levers are forced upwardly by the action of the said spring means to cause the other pair of arms to engage surface portions of the sleeve to resist upward movement thereof, the said spring, bell crank levers and surface portions being arranged and proportioned to cause movement of the bell crank levers upon the surface portions of the said sleeve to simulate the action of a dish-shaped disc spring having a ratio between the range of $\sqrt{2}$ to $\sqrt{8}$ for the free height of the said spring to the thickness of material used for such spring.

2. A snap action relief valve having an inlet and an outlet, a seat therebetween, a closure member having a stem thereon provided with a projection near its upper end, a slidably mounted stem sleeve having an enlarged flange at an intermediate portion thereof, a bellows attached to the enlarged flange of the stem sleeve and to the housing of the said valve, another bellows within the first named bellows attached to the stem sleeve and to the closure member, a helical spring above the enlarged flange, bell crank levers so pivoted above the said helical spring that one pair of arms of the bell crank levers are forced upwardly by the action of the helical spring to cause the other pair of arms to act against inclined surfaces on the sleeve to resist upward movement thereof, the said spring, bell crank levers and inclined surfaces being arranged and proportioned to cause the action of the bell crank levers upon the said inclined surfaces to simulate the action of a dish-shaped annular disc spring having a ratio between the range of $\sqrt{2}$ to $\sqrt{8}$ for the free height of the said spring to the thickness of material used for such spring, the said bellows providing means to direct the inlet pressure to lift the said sleeve to a location in which the sleeve strikes the projection on the stem.

3. A snap action relief valve comprising a casing having an inlet and an outlet, a seat therebetween, a closure member having a stem thereon, a slidably mounted sleeve cooperating with the said stem and having an enlarged flange thereon, a bellows attached to the enlarged flange portion of the stem sleeve and to the casing of the said valve, another bellows within the first named bellows attached to the said sleeve and to the said closure member, resilient means above the enlarged flange portion of the said sleeve, levers pivoted above the said resilient means so that one pair of arms of the levers are forced upwardly by the action of the said resilient means to cause the other pair of arms to engage surface portions of the said sleeve to resist upward movement thereof, the said resilient means, levers and surface portions being arranged and proportioned to cause movement of the levers upon the surface portions of the said sleeve to simulate the action of a dish-shaped disc spring having a ratio between the range of $\sqrt{2}$ to $\sqrt{8}$ for the free height of the said spring to the thickness of material used for such spring, the said levers being mounted to rotate about a common axis therebetween.

4. A snap action relief valve comprising a casing having an inlet and an outlet, a seat therebetween, a closure member having a stem thereon, a slidably mounted sleeve cooperating with the said stem and having an enlarged flange portion at an intermediate portion thereof, a bellows attached to the enlarged flange portion of the stem sleeve and to the casing of the said valve, another bellows within the first named bellows attached to the said sleeve and to the said closure member, spring means above the enlarged flange portion, levers pivoted above the said spring means so that one pair of arms of the levers are forced upwardly by the action of the said spring means to cause the other pair of arms to engage surface portions of the sleeve to resist upward movement thereof, the said spring, levers and surface portions being arranged and proportioned to cause movement of the levers upon the surface portions of the said sleeve to simulate the action of a dish-shaped disc spring having a ratio between the range of $\sqrt{2}$ to $\sqrt{8}$ for the free height of the said spring to the thickness of material used for such spring.

5. A snap action relief valve having an inlet and an outlet, a seat therebetween, a closure member having a stem thereon provided with stop means near its upper end, a slidably mounted stem sleeve having an enlarged flange thereon, a bellows attached to the stem sleeve and to the housing of the said valve, another bellows within the first named bellows attached to the stem sleeve and to the closure member, a helical spring above the enlarged flange, levers so pivoted above the said helical spring that one pair of arms of the levers are forced upwardly by the action of the helical spring to cause the other pair of arms to act against inclined surfaces on the sleeve to resist upward movement thereof, the said spring, levers and inclined surfaces being arranged and proportioned to cause the action of the levers upon the said inclined surfaces to simulate the action of a dish-shaped annular disc spring having a ratio between the range of $\sqrt{2}$ to $\sqrt{8}$ for the free height of the said spring to the thickness of material used for such spring, the said bellows providing means to direct the inlet pressure to lift the said sleeve to a location in which the sleeve strikes the stop on the stem.

DONALD G. FAWKES.